United States Patent [19]
Priess

[11] Patent Number: 5,928,304
[45] Date of Patent: Jul. 27, 1999

[54] VESSEL TRAFFIC SYSTEM

[75] Inventor: Todd W. Priess, Marlboro, Mass.

[73] Assignee: Raytheon Company, Lexington, Mass.

[21] Appl. No.: 08/733,749

[22] Filed: Oct. 16, 1996

[51] Int. Cl.⁶ .................................................. G06F 165/00
[52] U.S. Cl. .......................... 701/200; 701/208; 701/212; 340/990; 340/995
[58] Field of Search ..................................... 701/200, 207, 701/208, 210, 212; 340/988, 990, 995; 73/178 R

[56] References Cited

U.S. PATENT DOCUMENTS 5,369,589  11/1994  Steiner ..................................... 701/200
5,377,102  12/1994  Nishiishigaki ............................ 701/200
5,444,618   8/1995  Seki et al. ................................. 701/200
5,543,788   8/1996  Mikuni ...................................... 701/200

*Primary Examiner*—William A. Cuchlinski, Jr.
*Assistant Examiner*—Gertrude Arthur
*Attorney, Agent, or Firm*—Daly, Crowley & Mofford, LLP; Christopher S. Daly

[57] ABSTRACT

A method and apparatus for merging specifies an inset chart shape and at least two chart scale values. A chart retriever retrieves data files defining a low-scale chart and a high-scale chart, and a chart processor identifies portions of the low-scale data files from which data is deleted and merges the modified low-scale data files with high-scale data files which provide high-scale data for the inset chart shape.

28 Claims, 13 Drawing Sheets

VESSEL TRAFFIC SYSTEM

FIELD OF THE INVENTION

This invention relates generally to electronic navigational charts and more particularly to methods and apparatus for displaying electronic navigational charts.

BACKGROUND OF THE INVENTION

As is known in the art, an electronic navigational chart is a three dimensional mathematical representation of part or all of a surface of the earth. An electronic maritime navigational chart typically includes hydrographical and topographical data such as water depth, shoreline locations, the existence of under water hazards such as rocks and islets, etc . . .

A particular area is often represented by a plurality of different charts, each of which represents the area or a portion thereof with a different scale. For example, the Port of Valdez, Ak. and the area thereabout is represented by a number of different charts at different chart scales including chart scales of 1:200,000, 1:40,000, 1:80,000, etc . . . Each of the charts provide hydrographical and topological information for a predetemined area in and around the Port of Valdez. Thus, a number of separate charts are often required to navigate a vessel in and around a particular area or port.

It is often necessary or convenient for a navigator to consult more than one chart substantially simultaneously. Thus when using paper charts, a navigator often concurrently views multiple charts in addition to other navigation aids such as floating aids to assist in navigating a vessel.

In the case of electronic navigational charts, the data for each chart is stored in separate data files. Thus, each time it is desirable or necessary to view a particular chart, a data processor must access the appropriate data file, read the data into a memory region of the data processor and display the data using appropriate image processing software. This process is often time consuming and computationally expensive. Furthermore, only one chart at a time at different scales can be viewed in such a manner. It is thus not possible to simultaneously view a plurality of different charts, each of which may be at different scales.

It would, therefore, be desirable to provide a system for combining a plurality of individual chart data files to provide a continuous chart database which allows viewing of multiple charts at different scales. It would also be desirable to provide a system for combining a plurality of individual chart data files in the DX90 data format to provide a continuous chart database which allows viewing of multiple charts at different scales.

SUMMARY OF THE INVENTION

In accordance with the present invention, a system for merging a plurality of electronic nautical navigational charts includes a user interface for receiving first and second scale levels and for receiving an identifier which identifies an inset chart shape, a chart retriever for retrieving a plurality of data files, each of the data files including navigational chart data and a chart processor for defining a hole in a low scale chart, for deleting data in the data files in the region of the hole and for filling the holes with data from a high scale chart data file. With this particular arrangement, a plurality of different electronic nautical navigational charts, each having a different chart scale can be merged to form a seamless chart database. The chart database can be imported into different application software and accessed by a user as though it were a single chart. In one particular embodiment, the plurality of user specified coordinates are specified by identifying a particular data file having particular coordinates stored thereon.

In accordance with a further aspect of the present invention, a method for merging electronic nautical navigational charts includes the steps of specifying first and second chart scale values and the coordinates of an inset shape, identifying cells which touch the inset shape, cutting out the shape of the inset and writing the data to a first temporary file for all cells identified. The method further includes the steps of dividing each of the small scale files identified in the identifying step into an appropriate number of cells based on the operator selected large scale level and merging the divided small scale charts with intact large scale charts and to produce a seamless chart database. With this particular technique, a seamless chart database formed from a plurality of different electronic nautical navigational charts each having a different chart scale is provided. The chart database can be imported into different application software and accessed by a user as though it were a single chart. This allows users to view a chart which includes data from different chart scales.

BRIEF DESCRIPTION OF THE DRAWINGS

The foregoing features of the invention, as well as the invention itself may be more fully understood from the following detailed description of the drawings, in which.

DESCRIPTION OF THE PREFERRED EMBODIMENTS

Figure 1:
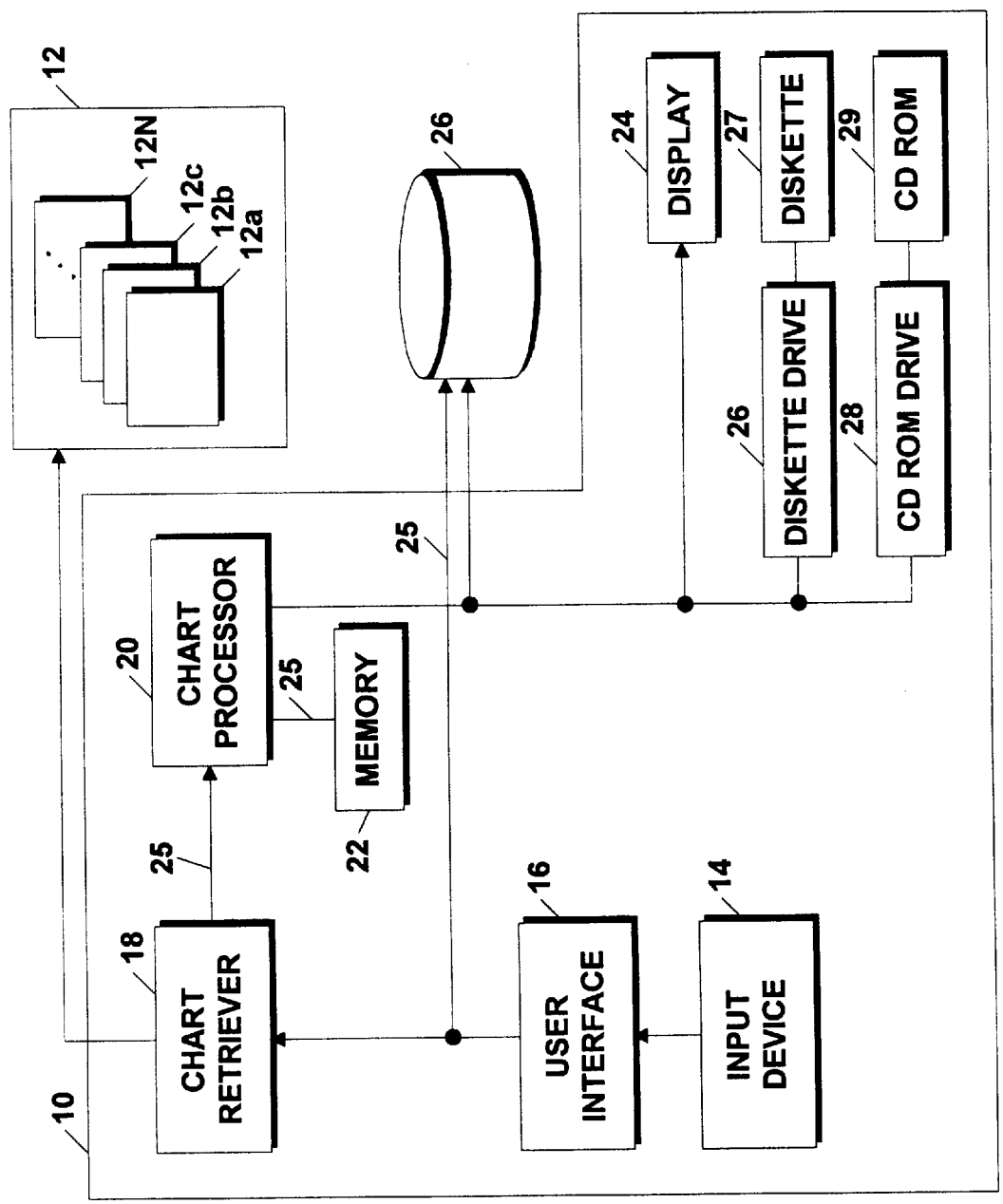
FIG. 1 is a block diagram of a chart merging system.

Referring now to FIG. 1, a system 10 for displaying electronic chart information stored in data files 12a–12N, generally denoted 12, and in particular for merging and simultaneously displaying data from two or more navigational charts includes an input device 14, a user interface 16, a chart retriever 18, a chart processor 20, a memory 22 and a display 24. Each of the aforementioned components are coupled via a data and communication bus 25.

Operation of computer system 10 is generally controlled and coordinated by operating system software. The operating system controls allocation of system resources and performs tasks such as processing, scheduling, memory management, networking, and I/O services, among other things. Thus, an operating system resident in system memory of system and being executed by a central processing unit (CPU) coordinates the operation of the other elements of computer system 10.

Also coupled to bus 25 is a diskette drive 26 into which a non-volatile mass storage device such as a diskette 27 may be inserted. Similarly, a compact disc read only memory (CD ROM) drive 28 into which a CD ROM 29 is insertable, is coupled to bus 25

Data and software may be provided to and extracted from computer system 10 via removable storage media such as diskette 27 and CD ROM 29. For example, data values generated using techniques to be described below in conjunction with FIGS. 2–4C may be stored on storage media similar to media 27, 29. The data values may then be retrieved from the media 27, 29 by a CPU and utilized by a CPU to perform display of electronic navigational charts.

Alternatively still, computer software useful for merging electronic navigational charts may be stored on storage media similar to media 27, 29. Such computer software may be retrieved from media 27, 29 for immediate execution by a CPU in any electronic chart display information system (ECDIS). A CPU may also retrieve the computer software and subsequently store the software in a system random access memory (RAM) or ROM for later execution by an ECDIS system, for example.

Figure 1A:
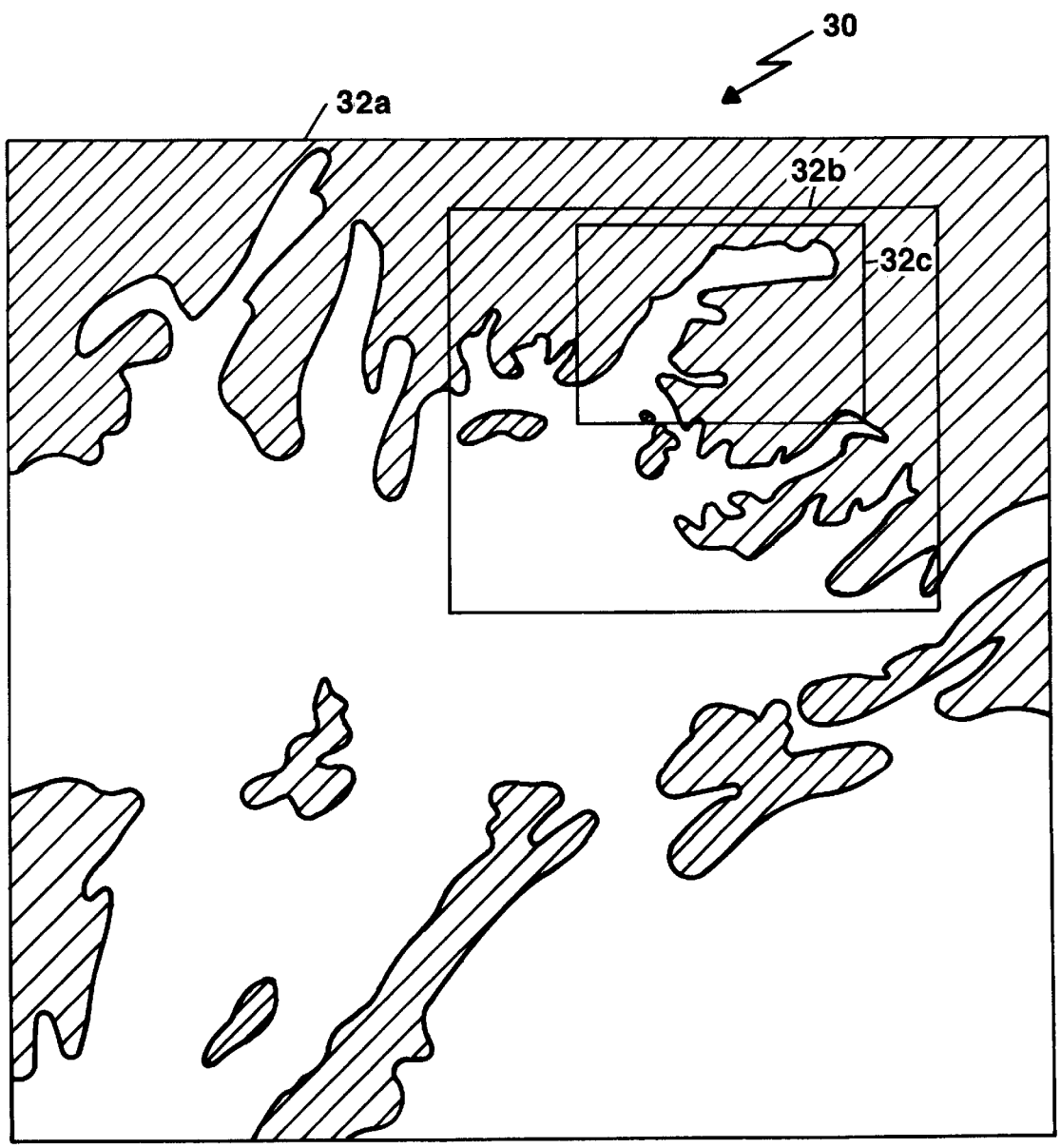
FIG. 1A is a diagrammatical illustration of multiple charts of an area.
Figure 1B:
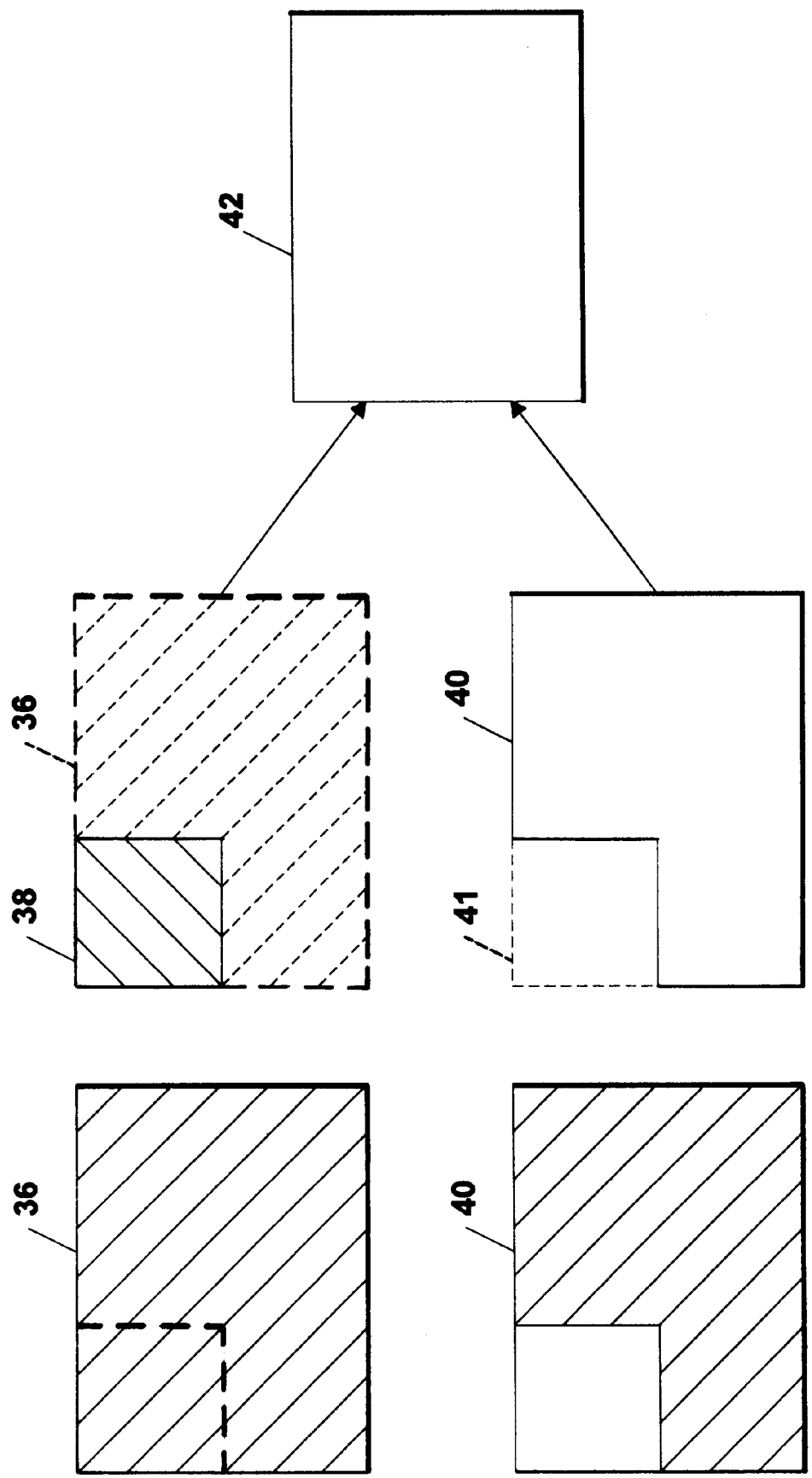
FIG. 1B is a diagrammatical illustration of two charts being merged.

In general overview and referring briefly to FIGS. 1A, 1B some introductory concepts and terminology related to merging of electronic navigational charts are explained.

Referring first to FIG. 1A, a diagrammatical view of an ocean port designated 30 represented by a plurality of charts 32a–32c generally denoted 32 is shown. Each of the charts 32 correspond to a presentation of the data stored in corresponding ones of digital data files such as data files 12 (FIG. 1). In FIG. 1A cross-hatched areas correspond to land and uncross-hatched areas correspond to water.

Each of the charts 32 represents a portion of the ocean port 30 at a different scale. Chart 32a represents the area at a first particular scale, for example at a scale of 1:200,000 while chart 32b represents only a portion of the total area represented by chart 32a but does so at a second particular scale for example at a scale of 1:80,000. Thus, the scale of chart 32a is small or low relative to the scale of chart 32b. Hence chart 32a may be referred to as a low scale chart while chart 32b may be referred to as a high scale chart.

Since chart 32b represents an area of the port at a higher scale than does chart 32a, chart 32b includes more detailed information than does chart 32a. In a similar manner chart 32c represents only a portion of the total area represented by chart 32a but does so at a third scale, for example a scale of 1:40,000. Thus, the scale of chart 32b is small or low relative to the scale of chart 32c. Hence when considering charts 32b, 32c, chart 32b may be referred to as a low scale chart while chart 32c may be referred to as a high scale chart.

Referring now to FIG. 1B, a merger between a first low scale chart such as chart 36 with a second high scale chart such as chart 38 is diagrammatically shown. The region represented by high scale chart 38 is shown in phantom in chart 36 and is sometimes referred to hereinafter as an inset. In general overview, the manner in which the two charts 36, 38 are merged is next explained.

First, the portion of the original low scale chart 36 corresponding to the inset region represented by the high scale chart 38 is identified. The data in the low scale chart 36 corresponding to a chart region to be replaced by the high scale chart data is then removed from the original low scale chart data file. This is accomplished by identifying those portions of the low scale chart data file(s) which will be replaced by data from the high scale data file(s) and removing the identified data from the low scale data file(s).

The modified low scale chart data file (i.e. the low scale chart data file having data removed therefrom) is stored in a memory region as a temporary file 40. Thus temporary file 40 corresponds to the original low scale data file having removed therefrom data which represented inset region 41. Next, the temporary file 40 is merged with the higher scale chart data file 38. Next, in a preferred embodiment, the original low scale file 36 is overwritten. Those of ordinary skill in the art will appreciate of course that the merged data file 42 may be stored in memory as a new file and that the original low and high scale data files may be preserved. This allows a user to merge together more than two charts. For example, it may be desirable in some applications to merge three or more charts.

The data in data files 12 (FIG. 1) which represent navigational charts may be stored in a variety of different data formats. In one particular embodiment, data files 12 contain data stored in a format devised by the International Hydrographic Organization (IHO) and referred to as a DX-90 format. IHO publication S-57 "IHO transfer standard for Digital Hydrographic Data (Theoretical Model, Object Catalogue, DX-90 Format)" describes a standard to be used for the exchange of digital hydrographic data between National Hydrographic Offices and for its distribution to manufactures, mariners and other data users, for example for the supply of data for Electronic Chart Display and Information Systems (ECDIS). Thus, in some embodiments, computer system 10 may correspond for example to an ECDIS.

An example of data in DX-90 format for the New York Harbor area is shown below. In accordance with the above-mentioned standard, such files are identified with an extension of "ddf" (e.g. filename.ddf).

An example of a data file in a ddf format is shown below.

| %s | %31d | %31d | | | | | | | | | | |
|---|---|---|---|---|---|---|---|---|---|---|---|---|
| length | level | leader | ext | res | app | ctrl | base | set | len | pos | res | tag : ddr |
| 879 | 3 | L | | | | 6 | 155 | 3 | 3 0 | 4 | | |
| 0000 108 0 = control 000 ;& 15221144.DDF | | | | | | | | | | | | |
| \| OBID | | | | | | | | | | | | |
| \| \| ATTF | | | | | | | | | | | | |
| \| \| OBPT | | | | | | | | | | | | |
| \| SEGT | | | | | | | | | | | | |
| \| \| ATTS | | | | | | | | | | | | |
| \| \| SG2D | | | | | | | | | | | | |
| \| \| SG3D | | | | | | | | | | | | |

```
| | ARCC
| | | AR2D
| | | EL2D
| | | CT2D
0001 36 108 = ident 0100;&Record Identifier^__rcid^__(I(5))^^
OBID 68 144 = 1600;&Object Identifier^__MODN!RCID!FTYP!FCMP!OBJL^__(2A(5),2A(1),A(6))^^
ATTF 47 212 = 2000;&Feature Attribute^__*ATFL!ATTV^__(A(6),A(!))^^
OBPT 51 259 = 2000;&Object Pointer^__*NAME!ORNT!USAG^__(A(10),2A(1))^^
SEGT 43 3 10 = 1600;&Segment Identifier^__MODN!RCID^__(2A(5))^^
ATTS 44 353 = 2000;&Segment Attributes^__*ATTL!ATTV^__(2A(!))^^
SG2D 50 397 = 2200;&Segment Coordinates (2D)^__*LATT!LONG^__(2R(!))^^
SG3D 55 447 = 2200;&Segment Coordinates (3D)^__*LATT!LONG!DEPT^__(3R(!))^^
ARCC 55 502 = 1600;&Arc/Curve Definition^___ATYP!SURF!ORDR^__(2A(1),I(1))^^
AR2D 55 557 = 2600;&Arc Coordinates^__STPT!CTPT!ENPT*LATT!LONG^__(2R(!))^^
EUD 69 612 = 2600;&Ellipse Coordinates^__STPT!CTPT!ENPT!CDPM!CDPR*LATT!LONG(2R(!))^^
CT2D 43 681 = 2200;&Curve Coordinates^__*LATT!LONG^__(2R(!))^^
length   res1   leader   res2   base   res3   len   pos   res   tag : dr
185             D               61            2     3     0     4
0001 6 0 : 1^^
OBID 19 6 : FE__AA00001LSSLCONS^^
ATTF 86 25 :
RECDAT19-OCT1991!RECINDNOS,digi!SCAMAX10000!SORDAT19-OCT-1991!SORINDNOS,GRAPH,12334!^^
OBPT 13 111 : FS__AA00001FE^^
length   res1   leader   res2   base   res3   len   pos   res   tag : dr
185             D               61            2     3     0     4
0001 6 0 : 3^^
OBID 19 6 : FE__AA00002LSDEPCNT^^
ATTF 86 25:
RECDAT19-OCT-1991!RECIDNOS,digi!SCAMAX10000!SORDAT19-OCT-1991!SORINDNOS,graph,12334!^^
OBPT 13 111 : FS__AA00002FE^^
length   res1   leader   res2   base   res3   len   pos   res   tag : dr
185             D               61            2     3     0     4
0001 6 0 : 5^^
OBID 19 6 : FE__AA00003LSDEPCNT^^
ATTF 86 25 :
RECDAT19-OCT-1991!RECINDNOS,digi!SCMAX10000!SORDATA19-OCT-1991!SORINDNOS,graph,12334!^^
OBPT 13 111 : FS__AA00003FE^^
length   res1   leader   res2   base   res3   len   pos   res   tag : dr
185             D               61            2     3     0     4
0001 6 0 : 7^^
OBID 19 6 : FE__AA00004LSBRIDGE^^
ATTF 86 25 :
RECDAT19-OCT-1991!RECINDNOS,digi!SCAMAX10000!SORDAT19-OCT-1991!SORINDNOS,graph,12334!^^
OBPT 13 111 : FS__AA00004FE^^
length   res1   leader   res2   base   res3   len   pos   res   tag : dr
185             D               61            2     3     0     4
0001 6 0 : 9^^
OBID 19 6 : FE__AA00005LSSLCONS^^
ATIF 86 25 :
RECDAT19-OCT-1991!RECINDNOS,digi!SCAMAX10000!SORDAT19-OCT-1991!SORINDNOS,graph,12334!^^
OBPT 13 111: FS__AA00005FE^^
length   res1   leader   res2   base   res3   len   pos   res   tag : dr
185             D               61            2     3     0     4
0001 6 0 : 11^^
OBID 19 6 : FE__AA00006LSBUISGL^^
ATTF 86 25 :
RECDAT19-OCT-1991!RECINDNOS,digi!SCAMAX10000!SORDAT19-OCT1991!SORINDNOS,graph,1234!^^
OBPT 13 111: FS__AA00006FE^^
length   res1   leader   res2   base   res3   len   pos   res   tag : dr
185             D               61            2     3     0     4
0001 6 0 : 13^^
OBID 19 6 : FE__AA00007LSRMLWY^^
ATTF 86 25 :
RECDAT19-OCT-1991!RECINDNOS,digi!SCAMAX1000!SORDAT19-OCT-1991!SORINDNOS,graph,1234!^^
OBPT 13 111: FS__AA00007FE^^
length   res1   leader   res2   base   res3   len   pos   res   tag : dr
185             D               61            2     3     0     4
0001 6 0 : 15^^
OBID 19 6 : FE__AA00008LSBUISGL^^
ATTF 86 25 :
RECDAT19-OCT-1991!RECINDNOS,digi!SCAMAX10000!SORDATA19-OCT-1991!SORINDNOS,graph,1234!^^
OBPT 13 111: FS__AA00008FE^^
length   res1   leader   res2   base   res3   len   pos   res   tag : dr
185             d               61            2     3     0 4
0001 6 0 : 17^^
OBID 19 6: FE__AA00009LSDEPCNT^^
ATTF 86 25 :
```

The processing required to merge charts having digital hydrographic data stored thereon described below in conjunction with FIGS. 2–4C is accomplished in one embodiment by transforming the data in the data files 12 from the DX-90 data format to a called "dai" format. An example of a data file in a dai format is shown below.

```
0001 5 1
OBID 19FE10100001SSADEPARE
ATTF 61DRVAL10.00DRVAL220.00SORINDMY,RMNHD,
graph,5RECDAT19960116
OBPT 12SE__010000SFE
**** 0
0001 5 2
OBID 19FE10100002SSALNDARE
ATTF 38SORINDMY,RMNHD,graph,5RECDAT19960116
OBFT 125E__010014FE
**** 0
0001 5 3
OBID 19FE10100003SSADEPARE
ATTF 61DRVAL10.00DRVAL220.00SORINDMY,RMNHD,
graph,5RECDAT19960116
OBPT 12SE__0100006FE
**** 0
0001 5 4
OBID 19FE10100004SSADEPARE
ATTF 61DRVAL10.00DRVAL220.00SORINDMY,RMNHD,
graph,5RECDAT19960116
OBPT 125E__01000015FE
**** 0
0001 5 5
OBID 19FE10100005SSALNDARE
ATTF 38SORINDMY,RMNHD,graph,SRECDAT19960116
OBPT 125E__0100007FE
**** 0
0001 5 6
OBID 19FE__0100006SSAM_PROD
ATTF 36CPDATE19960229PRCTRYITAGENCYCMPIT
OBPT 12SE__0100008FE
**** 0
0001 5 7
OBID 19FE__0100007SSAM_PROD
ATTF 36CPDATE19960229PRCTRYITAGENCYCMPIT
OBPT 12SE__0100016FE
**** 0
may be thousands of these OBID,ATTF,OBPT segments here . . .
followed by possible thousands of spatial 2D/3D references . . .
``` manipulating existing data elements, adding new data elements, and deleting unnecessary data elements, which results in the lower scale chart (e.g. chart 32a-FIG. 1A) appearing as though a 'hole' has been punched through it. The second higher scale chart (e.g. chart 32b-FIG. 1A) is formed or displayed in this hole by merging the sets of data which correspond respectively to the lower and higher scale charts. The result of the merged data sets is a seamless data set.

It should be appreciated of course that the principles and processes described below may be applied to data in a variety of different data formats including but not limited to the DX-90 format and that transformations of data from one data format to another data format may or may not be employed to facilitate processing of data It should also be noted that computer system 10 may be provided, for example, as a UNIX system, a DOS system or any equivalent computer system. The exemplary computer system 10 of FIG. 1 is for descriptive purposes only. Thus, although the description herein below may refer to terms commonly used in describing particular computer systems or particular data formats for data files 12, the description and concepts equally apply to other systems and data formats, including systems and data formats dissimilar to those mentioned in conjunction with FIG. 1.

Referring again to FIG. 1, user input device 14 may be provided, for example, as a conventional keyboard and/or a graphical user interface (GUI) which includes a mouse. A user utilizes the input device 14 to enter information used to identify charts to be merged. For example, in one particular embodiment, the user specifies latitude and longitudinal positional information which defines the shape of an inset. The operator also provides two file scale values, one of which is a high scale (high resolution) value which will have data merged into it. The second file corresponds to a low scale (low resolution) value from which the data to be merged is extracted.

System 10 thus allows a user to interactively set parameters defining various attributes needed for the chart merge process. The system 10 then merges two or more charts to form one seamless electronic chart.

Referring again to FIG. 1, user interface 16 receives the latitude and longitudinal positional information and the two

```
0001 5 37
SEGT 10SE__0100007
SG2D 5401.489636103.7092271.491399103.7039751.489610103.7012671.4896101
03.6314071.382930103.6314071.382930103.5763671.452930103.5763671.4
52930103.4981771.750470103.4981771.750470103.3833372.000000103.383
3372.0000000104.0000001.629250104.0000001.629250103.9841211.641461
103.9761961.641461103.9761961.636884103.9727781.632246103.976196
1.629250103.9732171.629250103.9613371.470060103.9613371.470060103.
8708671.489960103.8708671.489960103.8283071.496420103.8283071.4964
20103.7092271.489636103.70927
**** 0
0001 5 38
SEGT 10SE__0100008
SG2D 4002.000000103.3833372.000000104.0000001.814625104.0000001.6292501
04.0000001.629250103.9613371.470060103.9613371.470060103.8708671.4
89960103.8708671.489960103.8283071.496420103.8283071.496420103.709
2271.489610103.7092271.489610103.631407.382930103.6314071.382930
103.5763671.452930103.5763671.452930103.4981771.750470103.498177
1.750470103.3833372.000000103.38337
**** 0
0001 5 39
SEGT 10SE__0100009
S62D 3802.000000103.3833372.000000104.0000001.629250104.0000001.6292501
```

Thus in one embodiment, system 10 (FIG. 1) operates on data in the DX-90 format by transforming data formats, file scale values, and provides the information to chart retriever 18 which accesses the database of electronic maps 12.

In one embodiment each of the electronic maps 12a–12N has data stored therein in the called DX-90 format. In this case the chart retriever 18 extracts information from one of the chart files 12 in DX-90 data format and converts the data into a binary format. Chart processor 20 then generates a so-called reverse internal segment which corresponds to a perimeter of a hole or inset being cut from the low resolution file.

The chart processor 20 then removes from the data file all data describing all features in the inset. This includes deleting area features fully contained in the inset as well as forming every feature (both internal to the inset region and external to the inset region) which extends beyond the inset to the inset boundary. Chart processor 20 then removes all line features in the inset. This includes deleting all line features fully contained in the inset as well as forming line features which extend beyond the inset to the inset boundary. Next the chart processor deletes all sounding and point information in the inset. Chart processor 20 then reads data from the low resolution data file retrieved by chart retriever 18 and merges it with the high resolution file retrieved by chart retriever 20 in order to produce a seamless data file.

Chart processor 20 then displays the chart represented by the seamless data file on display 24 and also stores the seamless data file in a seamless data fie database 26 which may be provided as either a RAM or a write once read only memory (WOROM) for permanent storage of information. Database 26 thus includes electronic navigational charts having data at two different viewing scales.

Consequently, an electronic chart generated from a data file retrieved from database 26 by map retriever 18 and viewed on display 24 has first portions in which relatively large areas of information are displayed in relatively coarse detail and second portions in which relatively small areas of information are displayed in relatively fine detail.

For example, the first portion of the chart may have information displayed thereon at a resolution of 1:1,250,000 while the second portion of the chart may have data displayed thereon at a resolution of 1:20,000.

Figure 2:
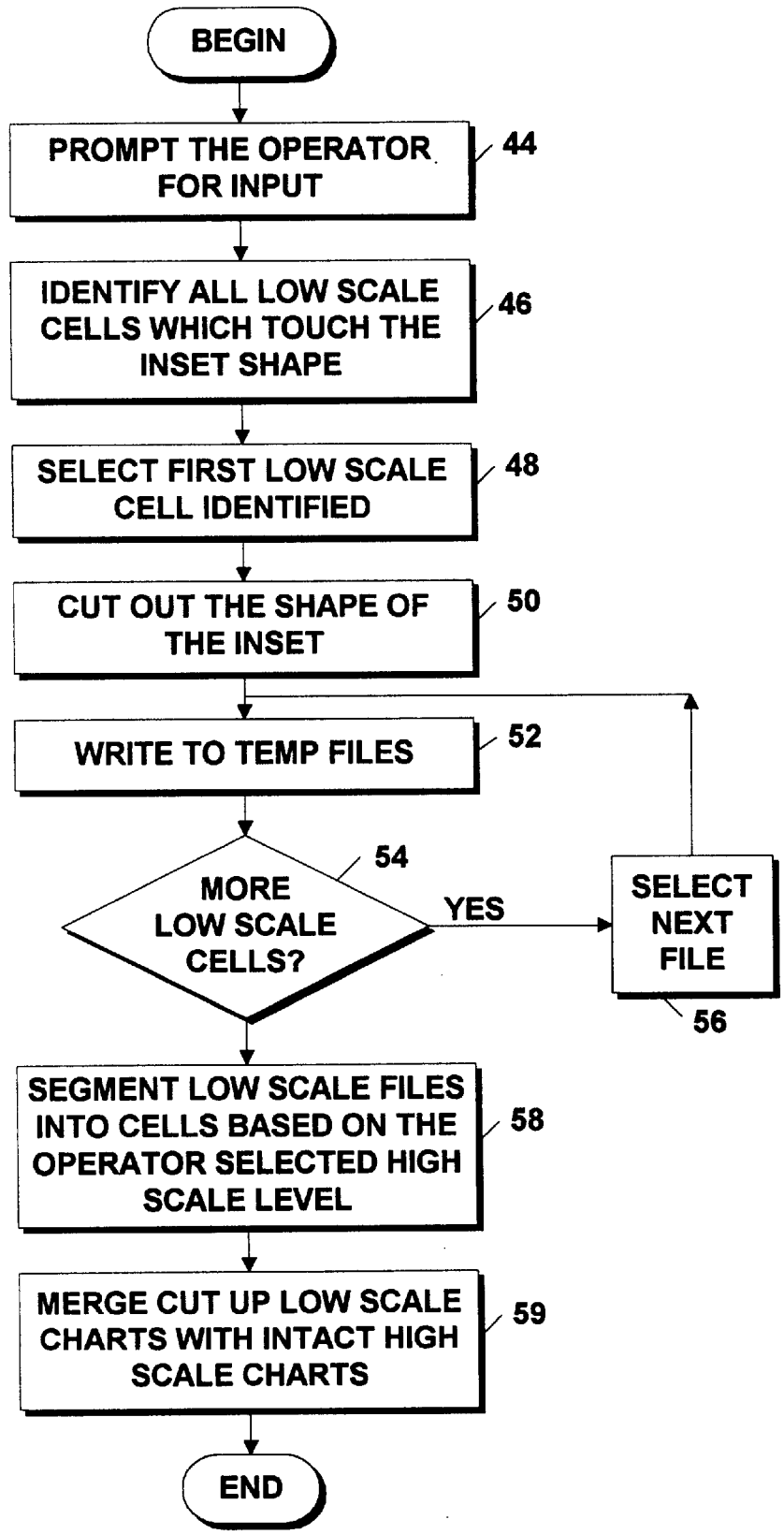
FIG. 2 is a flow diagram of the processing which produces a merged data file used in a vessel traffic system.
Figure 3:
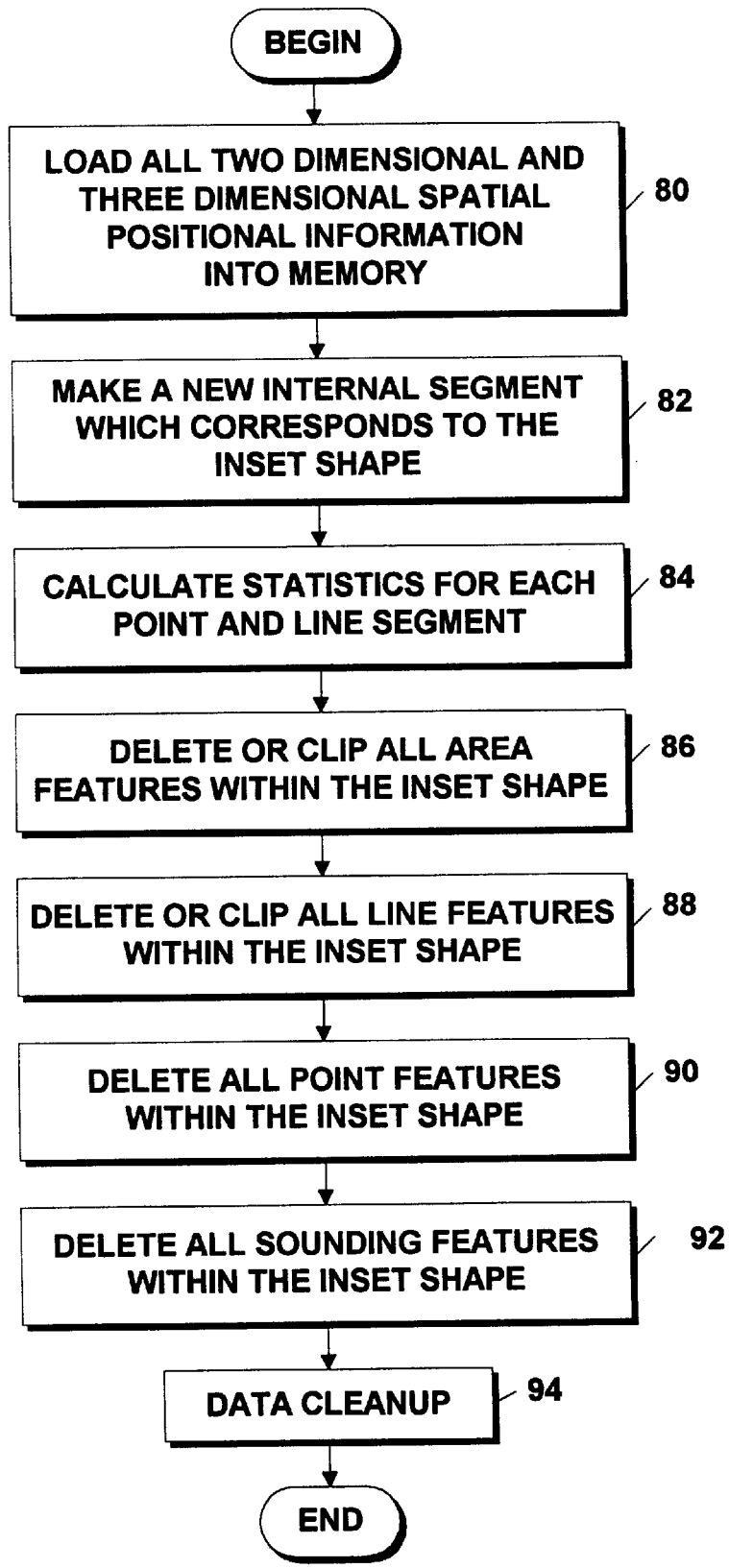
FIG. 3 is a flow diagram of the processing which takes place to cut out an inset shape from a low scale chart.
Figure 3A:
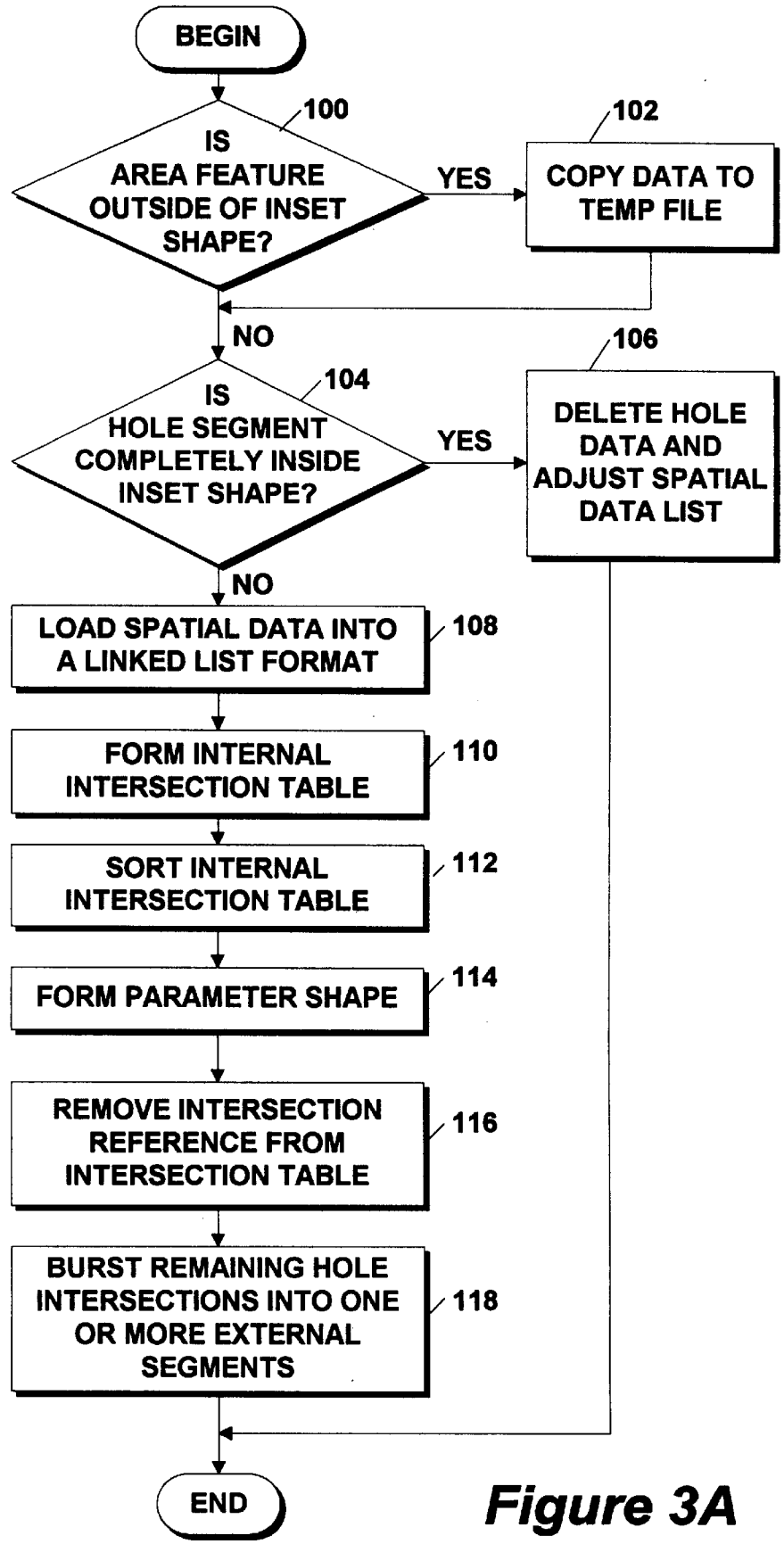
FIG. 3A is a flow diagram of the processing which takes place to cut out an inset shape from a low scale chart if any hole segments intersects an inset.
Figure 3B:
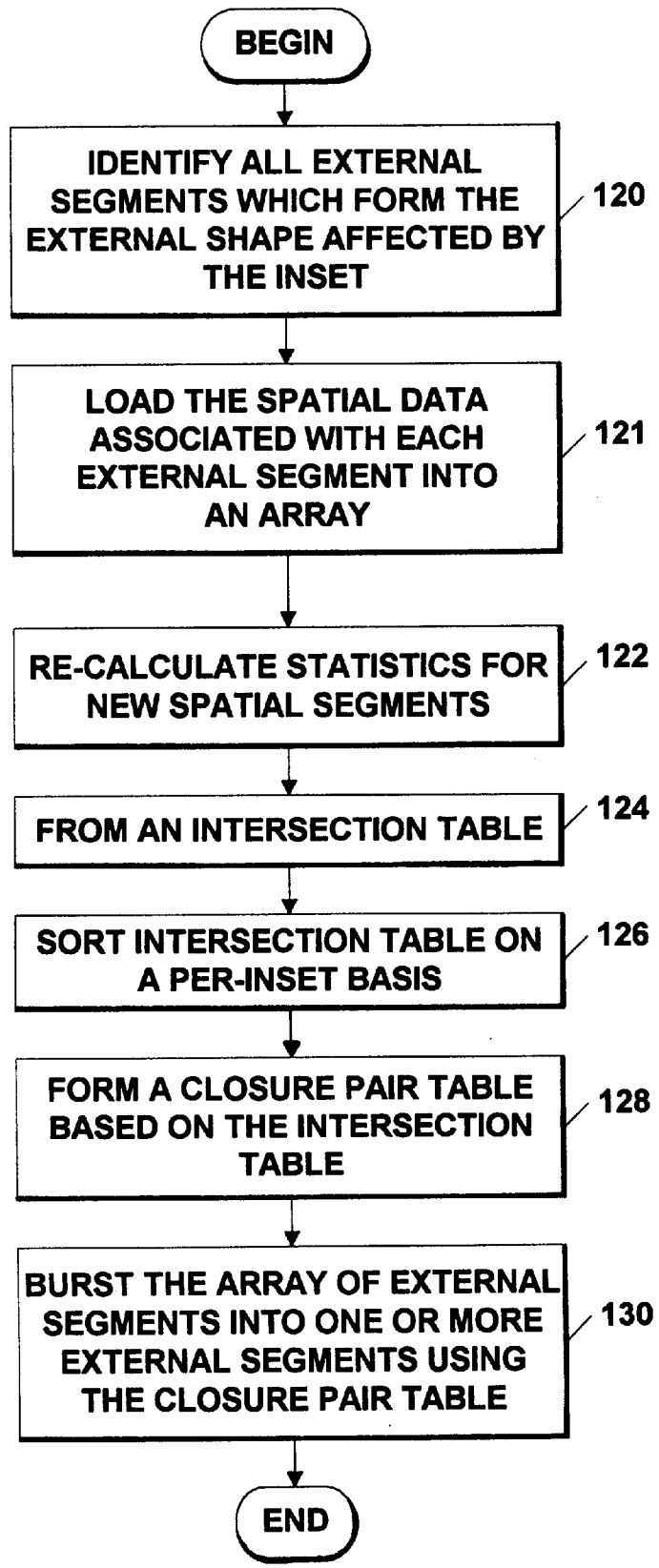
FIG. 3B is a flow diagram of the processing which takes place to cut out an inset shape from a low scale chart if an external shape is affected by an inset.

FIGS. 2 and 3–3B are a series of flow diagrams of the processing performed by apparatus 10 to merge two electronic navigational charts. The rectangular elements (typified by element 44), herein denoted "processing blocks," represent computer software instructions or groups of instructions. The diamond shaped elements (typified by element 54), herein denoted "decision blocks," represent computer software instructions, or groups of instructions which affect the execution of the computer software instructions represented by the processing blocks. The flow diagrams do not depict syntax of any particular programming language. Rather, the flow diagrams illustrate the functional information one skilled in the art requires to generate computer software to perform the processing required of apparatus 10 or alternatively the processing and decision blocks represent the steps performed by functionally equivalent circuits such data processing circuits or an application specific integrated circuit (ASIC). It should be noted that many routine program elements, such as initialization of loops and variables and the use of temporary variables are not shown.

Turning now to FIG. 2, processing block 44 prompts an operator or system user for an input. In response to the prompt, the operator provides to the system information which identifies the charts which are to be merged. Such identification may be made by having the operator provide latitude and longitude positional information which corresponds to the shape of an inset and two file scale values. The first file scale value corresponds to a high scale value and the second file scale value corresponds to a low scale value. The corresponding data files hold low and high scale chart data respectively. The high scale chart data file corresponds to the data file from which the data corresponding to the inset is to be extracted. It should be noted that the charts may be identified in a variety of manners. For example, in a system in which the charts may be easily identified by chart number, then a user may simply identify the charts by chart number. Other chart identification techniques may also be used. Suffice it to say that the particular manner in which the two charts to be merged are identified should be selected to be compatible with the particular features and characteristics of the chart file database and facilitate user selection of charts to be merged.

Next, processing block 46 identifies all low scale data files or cells which contact the inset shape. These low scale data files have stored therein chart data which will be replaced by data from high scale data files. In some applications, the inset may be contained in a single low scale data file while in other applications the inset may contact a plurality of low scale chart data files.

Processing block 48 selects a first one of the low scale data files and processing block 50 removes from the low scale data file data which is contained within the inset region in that particular data file. Processing block 52 stores the modified high scale data file as a temporary file in memory. Decision block 54 and processing block 56 implement a loop in which each of the low scale data files identified in processing block 46 are processed by processing blocks 50 and 52 as described above. Steps 46–56 are pictorially represented in FIGS. 2A and 2B.

Figure 2A:
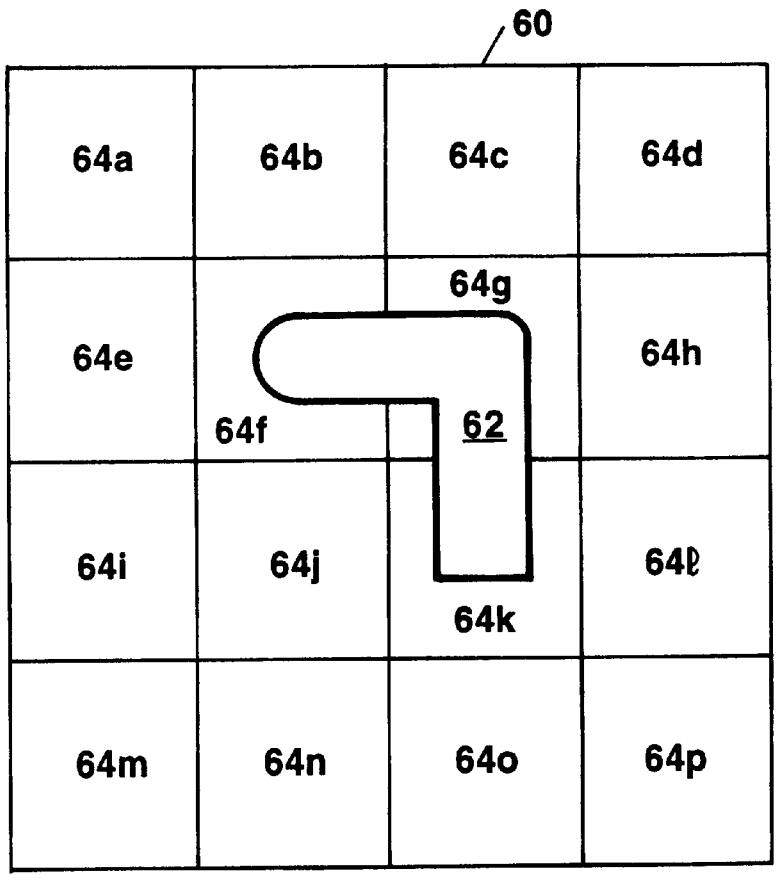
FIGS. 2A–2D are a series of diagrammatical representation of two charts of different scales being merged.
Figure 2B:
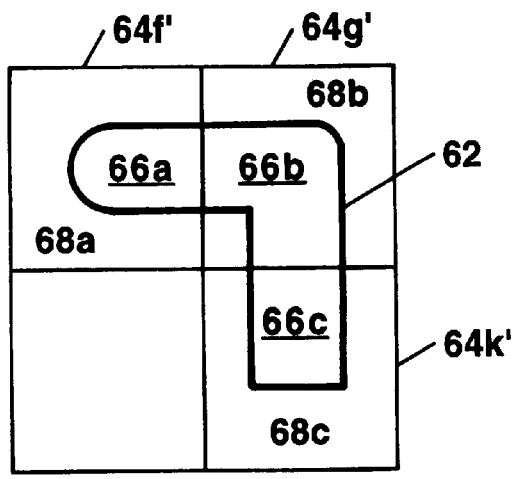

Referring briefly to FIGS. 2A and 2B, a low scale chart 60 is shown having an inset region 62 defined therein. In FIGs, 2A, 2B, the low scale chart is pictorially represented as an array of cells 64a–64p generally denoted 64 which taken together form low scale chart 60. Those of ordinary skill in the art will appreciate of course that each of the cells corresponds to one of a set of low scale data files 64a–64p. Each of the low scale data files has stored therein digital data values which represent boundaries, features and characteristics of the physical region region represented thereby. Thus each cell 64 is stored on a digital data storage device (e.g. a magnetic disk or diskette, a CD ROM. a magnetic tape, etc . . . ) as a sequence of digital data values.

As can be seen from an inspection of FIG. 2A, high scale data files or cells 64f, 64g, 64k can be identified as contacting inset shape 62. Thus portions of high scale data files 64f, 64g and 64k are further processed.

Such processing may first proceed by copying the data stored in data files 64f, 64g and 64k to temporary files where processing can take place. Thus files 64f', 64g' and 64k' shown in FIG. 2B may be taken as representing tempory files generated for processing convenience. It should be noted that the use of such temporary files, however is not required and in some applications where memory limitations or other limitations exist, it may be desirable to not generate such temporary files. It should be noted that temporary files are always needed if it is desired to keep the original files in tact.

As can be more clearly seen in FIG. 2B, and considering first cell 64f, inset region 62 occupies a portion 66a of cell 64f' while cell portion 68a is unoccupied by inset region 62. Thus, in accordance with the processing steps 44–59 described above in conjunction with FIG. 2, the data in the area 66a of cell 64f' is removed while data in area 68a of cell 64f is left unchanged.

In a similar manner in cell 64g', data in area 66b is removed while data in area 68b is retained and in cell 64'k, data in area 66c is removed while data in area 68c is retained. Thus, tempory files 64f', 64g', 64k' includes data for regions 68a, 68b and 68c and does not include data from regions 66a, 66b, 66c.

Referring again to FIG. 2, processing block 58 divides each low scale data file processed in steps 46–56 into a plurality of cells to allow the cells to be represented at the large scale level specified by the user in step 44. Once the low scale cells are properly represented as a plurality of high scale cells, processing block 59 merges the modiifed low scale cells with the high scale cells to provide a merged data file. Processing block 58, 59 are pictorially represented in FIGS. 2C and 2D discussed below.

Figure 2C:
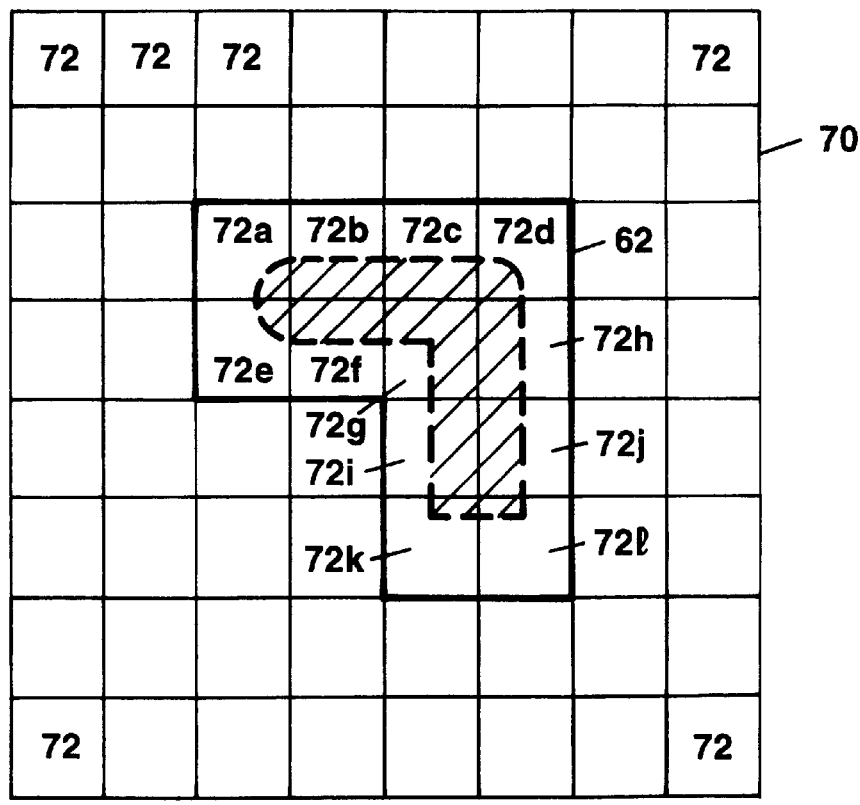

Referring briefly to FIG. 2C, a high scale chart 70 is provided from a plurality of cells generally denoted 72. Overlayed on chart 70 is inset region 62. As can be seen in FIG. 2C, the three cells 64f, 64g, 64k (FIGs, 2A, 2B) in low scale chart 60 correspond to ten cells 72a–72l in large scale chart 70.

Figure 2D:
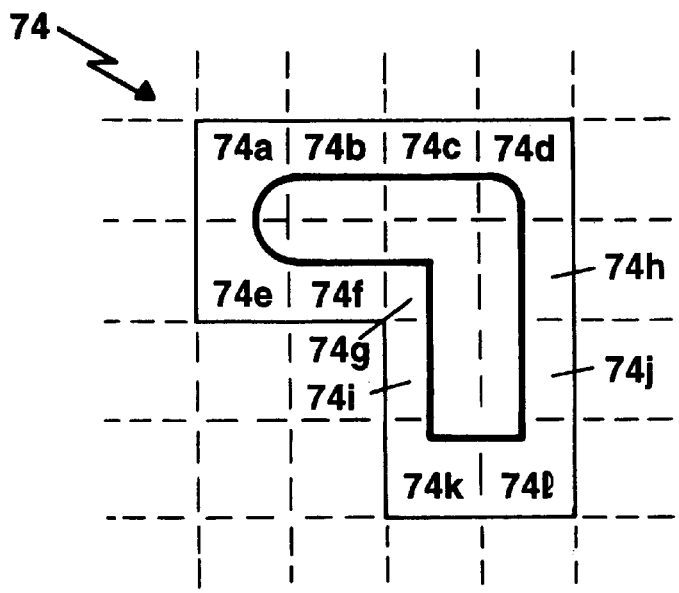

As shown in FIG. 2D and described in step 58, each of the low scale chart data files 64f, 64g, 64k are divided into a number of cells corresponding to the number of cells which exist in the high scale chart 70. Thus, in this particular example, the three low scale chart data files 64f', 64g', 64k' are divided into twelve cells 74a–74l corresponding to cells 72a–72l (FIG. 2C) of low scale chart 70 (FIG. 2C). This results in a segmented low scale chart 74.

Once the low scale cells are divided into an appropriate number of large scale cells, the segmented chart 74 is merged with an in-tact high scale chart (e.g. chart 38 FIG. 1B) to thus result in a merged data file which includes both high scale and low scale data.

Referring now to FIG. 3, the particular manner in which the data files are cut and subsequently merged is explained. Processing block 80 loads a two-dimensional and three-diemnisonal spatial positional information into memory, sorted by a segemnt identifier (SEGT number) and treated as chain-node segments. The data is loaded as it appears in the segment identifer, not as "forward" or "reverse" referenced data. It should be noted that spatial data may span multiple two-dimensional or three-dimensional segment coordinates due to the relatively large number of vectors which may be involved in representing a physical area. Such multiple spatial data segments are loaded into memory as a series of linked lists.

Processing block 82 generates a new 'Internal' segment having a shape which corresponds to the inset shape. Any future reference to this segment when forming new holes is done using chain-node referencing. Processing block 84 computes statistics for each point and line segment. The statistics indicate whether a point is inside, outside or on the inset shape and whether an intersection point exists between the line segment and the inset shape. As will be discussed below, this is later recalculated since the intersection point reference changes based on whether the spatial data is referenced 'Forward' or 'Reverse' by corresponding object pointer (OBPT) segments. Since segments have a particular direction (e.g. formed in a counterclockwise direction), the statistics also indicate whether a line segment enters or exits the inset at the intersection point as well as an inset side number where the intersection is located.

Next processing block 86 deletes or clips all area features within the inset shape. FIG. 3A shows the details of the processing performed in step 86 if any hole segments intersect the inset and FIG. 3B shows the details of the processing performed in step 86 if the external shape is affected by the inset (e.g. the external shape intersects or surrounds the the inset). If the external shape is not affected by the inset (e.g. the external shape neither intersects or nor surrounds the the inset) then processing block 86 copies the data to a temporary file in memory.

Processing continues in processing block 88 which deletes or clips all line features within the inset shape. In processing block 88, if a line intersects the inset once, the portion of the line inside the inset is clipped off, and a new 'redundant-sequential' segment is made. The original segment may be used by other features. It should be noted that the parent's attribute set in the new feature is maintained.

Similarly in processing block 88, if a line intersects the inset more than once, those portions of the line inside the inset are clipped off and the single object is burst into multiple line objects, each of which inherits the parent's attributes. It should be noted that objects which burst into multiple objects after clipping must retain all attributes of the original/parent object.

Also in processing block 88, if no intersection between a line and the inset exists, processing block 88 copies data as is to a temporary file and processing continues to processing block 90.

Processing block 90 deletes all point features within the inset shape. If a point feature is within the inset shape, processing block 90 deletes its spatial reference and attribute data. It should be noted that processing block 90 does not delete spatial data as it may be used by other objects. If a point feature is outside the inset, then processing block 90 copies data without modification to a temporary file and processing continues in processing block 92. Processing block 90 also resequences and recalculates all spatial references. If spatial references to a composite object were deleted, processing block 90 deletes a corresponding high level composite object definition. Processing then flows to processing block 92.

Processing block 92 then deletes all sounding features within the inset shape. If a sounding feature is within the inset shape, processing block 92 also deletes its spatial reference. If a sounding feature is outside inset, processing block 92 copies data as is to a temporary file and processing continues to processing block 94.

Processing block 94 reformats data as necessary by resequencing all record identifer segments (designated as "0001 segments" in the IHO standard) so that they are sequential, removing any spatial data which is unreferenced and resequencing all spatial references so they are sequential. Processing then ends.

Referring now to FIG. 3A, decisison block 100 determines if an area feature is outside the inset shape. If the area feature is outside the inset shape, processing block 102 copies data directly to the temp file and prosing continues to decision block 104. Decision block 104 determines if any hole (internal) segment is completely inside the inset. If decisison is made that hole is completely inside the the inset, then processing flows to processing block 106 where the hole data is deleted and all remaining entries in the spatial data list are moved up by an appropriate number of entries.

If decision block 104 determines that any 'hole' segments intersect the inset, then processing continues to processing block 108 which loads the spatial data for all 'hole' segments which intersect the inset sequentially into a linked-list format maintaining the 'Forward' and 'Reverse' sequencing. Thus all segments are loaded into the array using forward references. Each new complete 'hole' (which may span multiple spatial references) forms a new linked list.

Processing block 110 then forms an 'internal intersection table', which contains information on all hole/inset intersections, and an identiifer of the linked list from which the data was derived.

Processing block 112 then sorts the 'internal intersection table' on a per-inset side basis. Intersections are sorted by distance from the starting point of the particular inset side. Processing block 114 forms a 'perimeter' shape by following the outside extent of the holes. This is done by selecting a point along the inset which is outside any holes, following the inset shape to the first intersection, and following the spatial data by jumping between elements in the linked list. These intersection references are then removed from the intersection table. This leaves 'hole' intersections which may need to be burst into external segments. Steps 108–116 are diagrammatically illustrated in FIGS. 4–4B.

Processing then proceeds to processing block 118 which bursts the remaining 'hole' intersections into one or more external segments. Each of the external segments inherits the attribute information from the parent feature. As each external segment is processed the corresponding intersection entries are removed from the intersections table.

it should be noted that hole relationships must be maintained. Thus, a clipped area either becomes a new hole, merges with other holes or absorbs holes. It should also be noted that if the inset extends outside the extent of the external area, the newly formed perimeter shape is used as the inset shape for the remaining clipping operations. Processing then ends.

Referring now to FIG. 3B, the processing which takes place if the external shape is affected by the inset (intersects or surrounds it) is shown. Processing block 120 identifies all external segments which form the external shape and loads the spatial data associated with the external segment sequentially into an array.

Processing block 122 recalculates, for the new spatial segment, the statistics previously computed in processing block 84 for each point and line segment. The statistics indicate whether a point is inside, outside or on the inset shape, the existence of an intersection point between the line segment and the inset shape, whether a line segment goes enters or exits the inset at the intersection point and an inset side number where the intersection is located.

Processing then proceeds to processing block 124 which forms an external intersection table' and processing block 126 which sorts the 'external intersection table' on a per-inset side basis. Intersections are sorted by distance from a starting point of the particular inset side.

Processing block 128 forms a closure pair table based on the intersection table. The closure pair table is formed by detecting which two successive intersections, if closed, would form a new external segment.

Processing then proceeds to processing block 130 where the external array is burst into one or more external segments using the closure pair table. This process generates new spatial data, references to the new spatial data, and results in the new external object inheriting the attributes of the parent area feature. Processing then ends.

Figure 4:
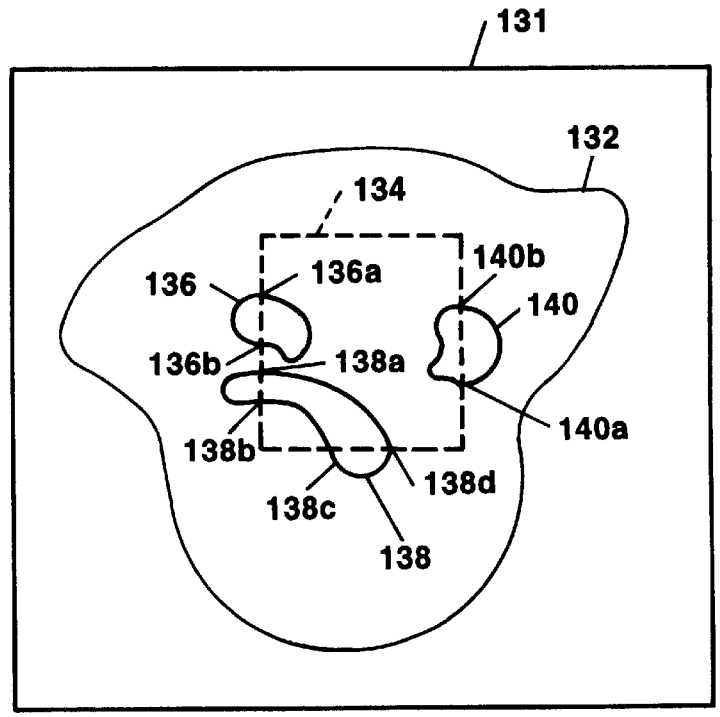
FIGS. 4–4C are a series of diagrammatical views representing the processing which takes if a hole segment intersects an inset.
Figure 4A:
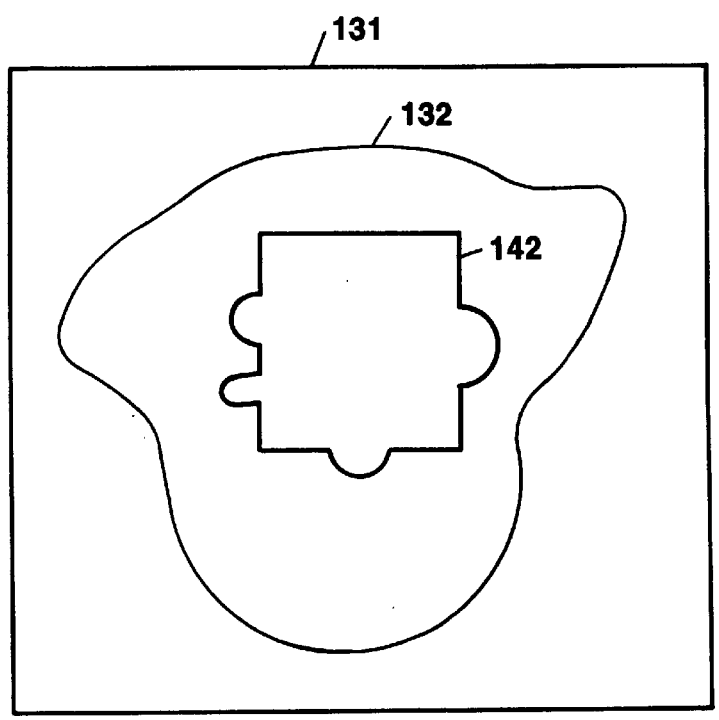

Referring now to FIGS. 4 and 4A, in which like elements are provided having like reference designations, a chart 131 includes a region 132 in which an inset 134 exists. Inset 134 intersects a plurality of holes 136, 138, 140. A perimeter shape 142 is formed by following the outline of the inset 134 as well as the outline of those regions of the holes 136–140 which are external to the inset 134. The perimeter shape 142 becomes a new segment which is internal to region 132. Those portions of the perimeter 142 corresponding to portions of the holes 136–140 are formed by following the spatial data and jumping between elements in a linked list which links a description of what the object is (i.e. a feature object) to a description of the objects' shape and location (i.e. a spatial object).

Figure 4B:
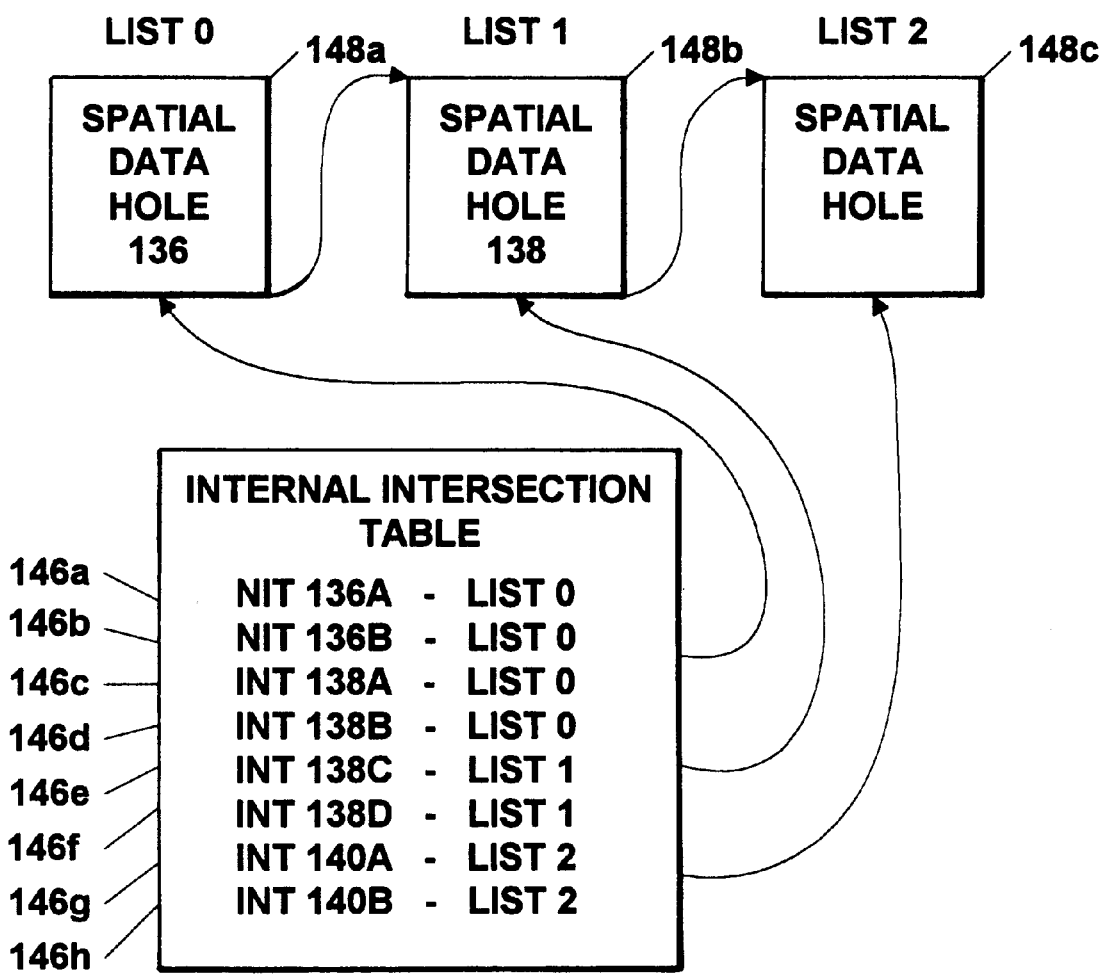

FIG. 4B, illustrates an Internal Intersection Table 144 which holds identifiers 146a–146h for each intersection of the holes 136–140 with the inset 134. For each of the identifiers 146a–146h Internal Intersection Table 144 also holds the name of a list 148a–148c which holds the spatial data for each of the holes 136–140. Thus list 148a holds the spatila data to for hole 136, list 148b holds the spatial data for hole 138 and list 148c holds the spatial data for hole 140. As can be seen from FIG. 4B, list 148a points to list 148b which in turn points to list 148c. Lists 148a–148c contian spatial data for holes 136–140 respectively.

Figure 4C:
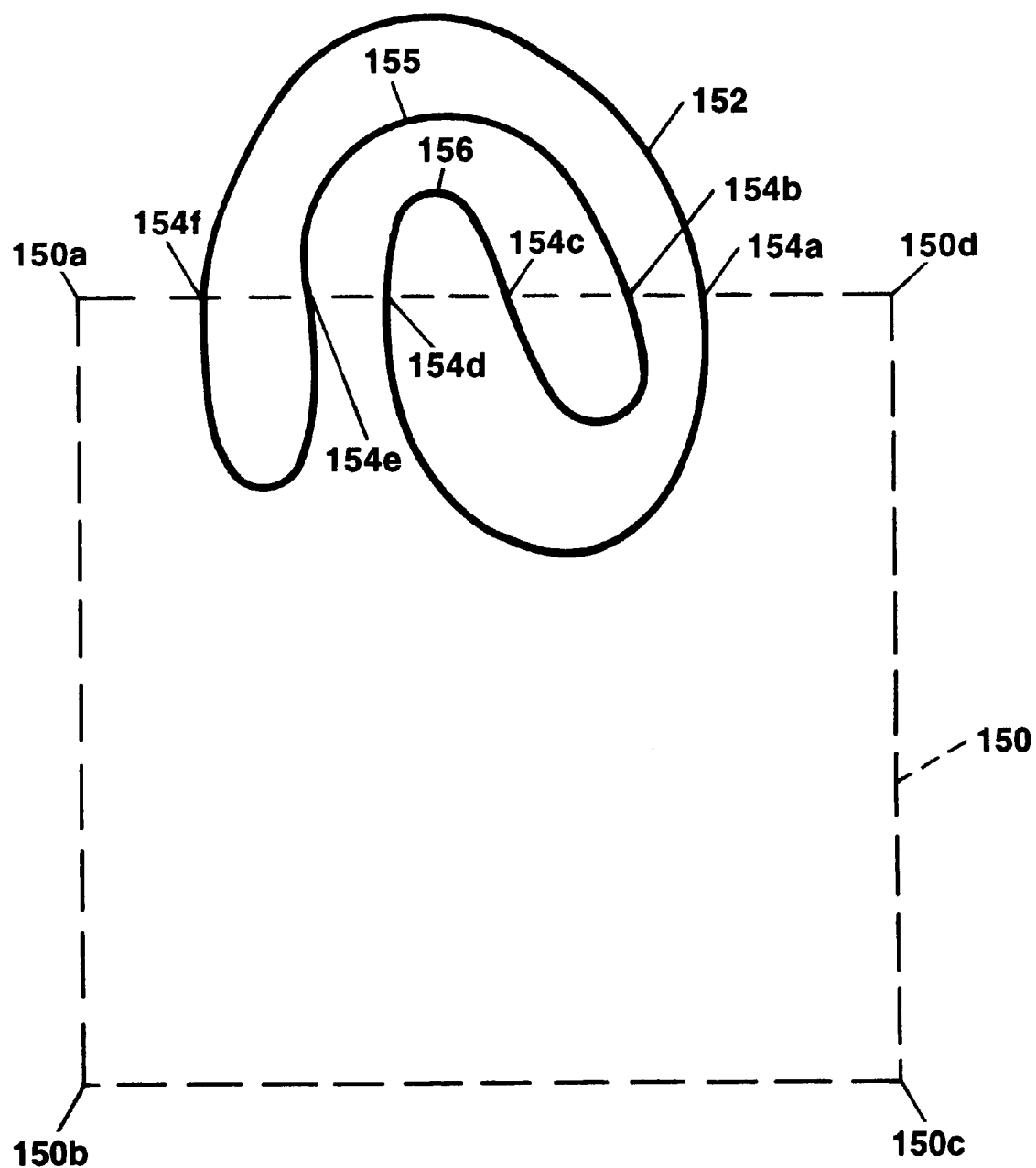

Referring now to FIG. 4C, a special case occurs when an inset bounday 150 having boundary points 150a–150d intersects an internal hole 152. In this case an external segment must be formed from clipped internal segments. Hole 152 and inset boundary 150 intersect at six points designated 154a–154f. Thus, the corresponding intersection table generated for inset boundary 150 and internal hole 152 includes six entries sorted from inset boundary point 150d. A perimeter is formed by the path defined by points 150a, 150b, 150c, 150d, 154a, 154f and returning to 150a.

Entries in the intersection table corresponding to points 154a and 154f are then removed from the intersection table and a new external segment defined by the path 155 between points 154b, 154e then to point 154d then along path 156 to point 154c and then back to point 154b is formed. Thus, a new object can be formed for the new external segment and the entries for points 154b–154e can be removed from the intersection table.

Figure 5A:
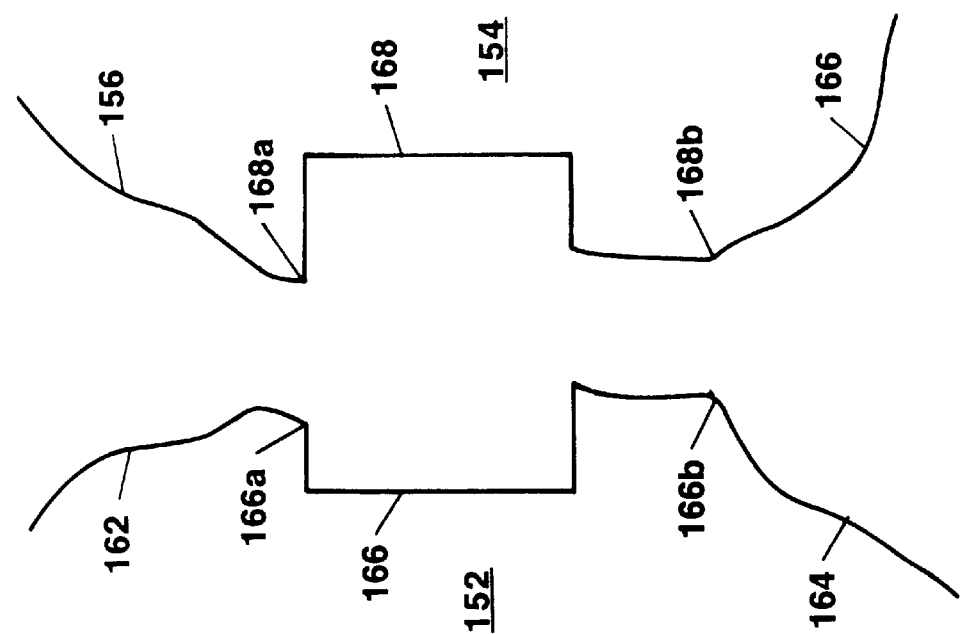
FIG. 5A is a diagrammatical view of a boundary which represents a path through the inset region of FIG. 5.
Figure 5:
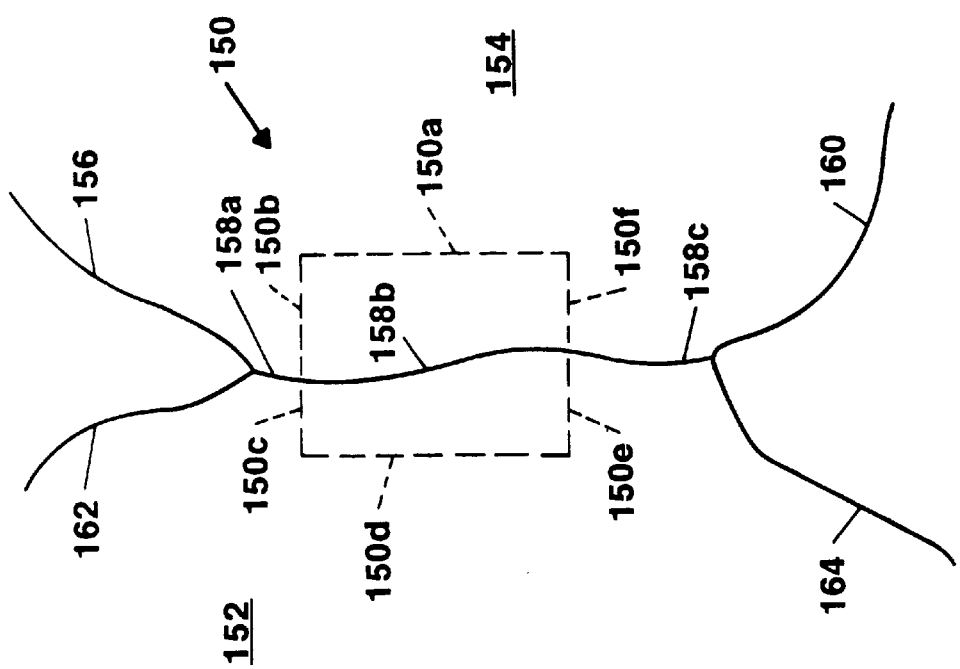
FIG. 5 is a diagrammatical view of an inset region.

Referring now to FIGS. 5 and 5A in which like elements are provided having like reference designations, an inset region 150 is disposed over a portion of a low-scale chart having a land region 152 and a water region 154. The water region has a boundary defined by a plurality paths 156, 158 and 160. The paths 156, 158, 160 each correspond to spatial objects in accordance with the conventions of the above-mentioned IHO Transfer Standard. Similarly, a boundary of the land region 152 is defined by a plurality of spatial objects here shown as paths 162, 158 and 164. It should be noted that paths 156, 160, 162 and 164 are provided as spatial objects while path 158 is a shared spatial object meaning that it defines the a boundary shared between land region 152 and water region 154.

Inset region 150 has a shape defined by paths 150a–150f. Inset region 150 intersects path 158. Three regions 158a–158c are identified along path 158. Regions 158a, 158c are outside the inset region 150 while region 158b is inside the inset region 150. It is thus necessary to cut the path 158 to thus allow high scale data vales to be inserted in the inset region 150.

The shared spatial object corresponding to path 158 is cut in two steps. First, a boundary formed by paths 162, 158a, 150c, 150d, 150e, 158c and 164. Next, the depth boundary is formed by paths 156, 158a, 150b, 150a, 150f, 158c, and 160. Once the two boundaries are formed the duplicate data is no longer used. The data within the inset region 150 is deleted and will be replaced by high-scale data values. Thus, as can be more clearly seen in FIG. 5A, the land 152 is now defined by path 162, a new path 166 having first and second ends 166a, 166b and path 164. New path 166 is formed from prior path portions 158*a,* 150*c,* 150*d,* 150*e,* 158*c.* Similarly, the depth boundary is now formed by path 156, new path 168 having first and second ends 168*a,* 168*b,* and path 160. New path 168 is formed from prior path portions 158*a,* 150*b,* 150*a,* 150*f,* 158*c.* Thus, path portions 158*a,* 158*c* are used in both of the new boundaries 166, 168. New spatial objects are generated for each of the new paths 166, 168 and the path 158*b* is deleted.

As indicated heretofore, aspects of this invention pertain to specific "method functions" implementable on computer systems. Those skilled in the art should readily appreciate that programs defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A chart merging system comprising:

a chart retriever for retrieving a plurality of data files, each of the data files including chart data with first ones of the data files defining a low scale chart and second ones of the data files defining a high scale chart;

a chart processor to generate an inset chart shape and to identify portions of the first ones of the data files affected by the inset chart shape;

means for removing data from those regions of the first ones of the data files within the inset chart shape;

means for merging the data files having removed therefrom data within the inset chart shape with the second ones of the data files corresponding to the inset chart shape and defining the high scale chart to provide a merged data file corresponding to a seamless chart;

means for displaying the merged data file as a seamless chart having an inset region having the inset chart shape, wherein the data inside the inset region corresponds to a chart scale which is higher than the chart scale of regions of the chart external to the inset region.

2. The chart merging system of claim 1 wherein said means for removing data from those regions of the first ones of the data files that are within the inset chart shape further comprises:

an area clipper to remove from the first ones of the data files area information located within the inset chart shape;

a line clipper to remove from the first ones of the data files line type information located within the inset chart shape; and a soundings clipper to remove from the first ones of the data files sounding information located within the inset chart shape.

3. The chart merging system of claim 2 further comprising a user interface to receive an inset chart shape, an inset chart location and first and second scale values; and wherein said chart retriever further comprises means coupled to said area clipper, said line clipper and said soundings clipper for numerically resequencing the merged data file and for re-numbering data items within the merged data file.

4. The chart merging system of claim 3 wherein each of the plurality of data files are in a first data format and said chart retriever further comprises means for converting at least a portion of the data in the first plurality of data files from the first data format to a second data format.

5. The chart merging system of claim 2 wherein said chart processor further comprises:

means for identifying paths which define boundaries of physical regions represented by the low scale chart which intersect a boundary of the inset chart shape; and means for determining whether each path identified by said means for identifying corresponds to a path into the inset chart shape or to a path out of the inset chart shape.

6. The system of claim 5 wherein the inset position is specified by first and second position values corresponding to latitude and latitude values.

7. The system of claim 5 wherein said chart processor further comprises means for dividing the data files having removed therefrom data which is internal to the inset chart shape into a number of segments to provide a segmented data file, wherein the number of segments corresponds to the number of segments in a region of the high scale data file having a size and a shape corresponding to a size and shape of the inset region.

8. The system of claim 7 wherein said chart processor further comprises means for merging the segmented data file with the low scale data file.

9. The system of claim 8 further comprising means for storing the merged data file as a seamless database file.

10. A method of merging two charts comprising the steps of:

(a) specifying a first value corresponding to a first chart scale and a second value corresponding to a second different chart scale wherein the first chart scale is lower than the second chart scale;

(b) specifying coordinates of an inset shape having an inset shape boundary;

(c) retrieving at least one data file which represents a chart at the first chart scale;

(d) identifying cells in each of the at least one data files which touch the inset shape boundary;

(e) for all cells identified in step (d), deleting data which contacts the inset shape;

(f) dividing each of the cells identified in step (d) into a predetermined number of segments, wherein the number of segments is determined from the second scale value; and (g) merging the cells divided in step (f) with at least one data file which represents a chart at the second chart scale to provide a merged data file.

11. The method of claim 10 wherein the step of merging the cells divided in step (f) with at least one data file which represents a chart at the second chart scale to provide a merged data file includes the step of merging the cells to provide a merged data file corresponding to a seamless chart.

12. The method of claim 11 further comprising the step of displaying the merged data file as a seamless chart having an inset region having the inset chart shape, wherein the data inside the inset region corresponds to a chart scale which is higher than the chart scale of regions of the chart external to the inset region.

13. The method of claim 12 further wherein step of deleting data which contacts the inset shape comprises the steps of:

(d1) loading all two-dimensional and three-dimensional spatial positional information into a memory;

(d2) generating a new internal segment having a shape corresponding to the inset shape;

(d3) for each point and line segment in the at least one data file which represents a chart at the first chart scale performmming the steps of:

determining the location of each point relative the inset shape;

determining an intersection point between each line segment and the inset shape;

determining a direction of each line segment relative the inset at the intersection point; and determining an inset side number where the intersection is located;

(d4) clipping all area features within the inset shape;

(d5) clipping all line features within the inset shape;

(d6) deleting all point features within the inset shape; and (d7) deleting all sounding features within the inset shape.

14. The method of claim 13 wherein the spatial data spans a plurality of two-dimensional coordinate spatial data segments and step (d1) further comprises the steps of loading the plurality of spatial data segments into memory as a series of linked lists.

15. The method of claim 13 wherein the spatial data spans a plurality of three-dimensional coordinate segments and step (d1) further comprises the steps of loading the plurality of spatial data segments into memory as a series of linked lists.

16. The method of claim 13 wherein step (d4) includes the steps of:

determining if the area feature is outside the inset shape; and in response to the area feature being outside the inset shape, copying data from the data file to a temporary file.

17. The method of claim 12 further comprising the step of determining whether the inset extends outside the extent of the external area; and in response to the inset extending beyond the inset region, performing the steps of:

sequentially loading the spatial data of all external segments which form the shape into an array;

recalculating statistics for the new spatial segment wherein the recalculation step includes the steps of:

for each point and line segment determining the location of the point relative the inset shape;

for each point and line segment, determining an intersection point between the line segment and the inset shape;

determining whether line segment enters or exits the inset shape at the intersection point; and determining the inset side number where the intersection is located;

forming an external intersection table;

sorting the external intersection table on a per-inset side basis;

forming a closure pair table; and using the closure pair table, bursting the external array into one or more external segments thereby generating new spatial data, references to the new spatial data, and inheriting the attributes of the parent area feature.

18. The method of claim 17 wherein the step of sorting the external intersection table on a per-inset side basis includes the step of sorting intersections by distance from the starting point of the particular inset side.

19. The method of claim 18 wherein the step of forming the closure pair table inlcudes the stps of:

examining the intersection table; and detecting which two successive intersections, if closed, would form a new external segment.

20. The method of claim 19 wherein the step of forming a perimeter shape includes the steps of:

selecting a point along the inset which is outside any holes;

following the inset shape to a first intersection;

s following the spatial data by jumping between elements in the linked list; and removing intersection references from the intersection table to provide one or more hole intersections.

21. The method of claim 16 wherein step (d5) further comprises the steps of:

determining the number of times a line feature intersects the inset shape;

in response to the line feature intersecting theinset once, then performing the steps of:

clipping off the portion of the line feature inside the inset shape; and making a new redundant-sequential segment;

maintaining the parent's attribute set in the new segment;

in response to the line feature intersecting the inset more than once, then performing the steps of:

clipping off the portion of the line inside feature the inset shape; and bursting a single object which represents the line feature into multiple line objects, each of which inherits attributes from the single line object; and in response to the line feature not intersecting the inset then copying the data to a temporary file.

22. The method of claim 13 wherein step (d6) further comprises the steps of:

in response to the point feature being within the inset shape, deleting the spatial reference and attribute data of the point feature;

in response to the point feature being outside the inset shape, copying data as is to a temporary file;

resequencing all spatial references;

recalculating all spatial references; and in response to the spatial references to a composite object being deleted, performing the step of deleting a corresponding high level composite object definition.

23. A computer program product for generating a chart file, the computer program product comprising:

a computer useable medium having computer readable program code to receive an inset chart shape, a first value corresponding to a first chart scale and a second value corresponding to a second chart scale wherein the first chart scales is lower than the second chart scale;

a computer useable medium having computer readable program code to retrieve a plurality of data files with first ones of the plurality of data files corresponding to at least a portion of a first chart at the first chart scale value and second ones of the plurality of data files corresponding to at least a portion of a second chart at the second chart scale;

a computer useable medium having computer readable program code to generate an inset chart shape and to identify portions of the first ones of the plurality of data files which are internal to the inset chart shape;

a computer useable medium having computer readable program code to remove data from those portions of the data files which are internal to the inset chart shape; and a computer useable medium having computer readable program code to merge the data files having removed therefrom data which is internal to the inset chart shape with the second ones of the plurality of data files to provide a merged data file corresponding to a seamless chart having an inset region having the inset chart shape, wherein the data inside the inset region corresponds to a chart scale which is higher than the chart scale of regions of the chart external to the inset region.

24. The computer program product of claim 23 further comprising:

a computer useable medium having computer readable program code to identify boundaries of physical regions represented by the low scale chart which intersect the boundary of the inset chart shape; and a computer useable medium having computer readable program code to generate a new boundary for each of the physical regions which intersect the boundary of the inset shape.

25. The computer program product of claim 24 wherein the computer useable medium having computer readable program code to generate a new boundary includes computer readable program code to include at least a portion of the inset boundary as at leats a portion of the new boundary for each of the physical regions which intersect the boundary inset shape.

26. The computer program product of claim 23 wherein said computer useable medium having computer readable program code to merge the data comprises computer readable program code to divide the data files having removed therefrom data which is internal to the inset chart shape into a number of segments to porvide a segmented data file, wherein the number of segments corresponds to the number of segments in the high scale data file in a region corresponding to the size and shape of the inset region.

27. The computer program product of claim 26 wherein the computer readable program code to merge the data files includes computer readable program code to merge the segmented data file with the low scale data file.

28. The computer program product of claim 23 further comprising:

a computer useable medium having computer readable program code to display the merged data file as a seamless chart having an inset region having the inset chart shape, wherein the data inside the inset region corresponds to a chart scale which is higher than the chart scale of regions of the chart external to the inset region.

* * * * *

UNITED STATES PATENT AND TRADEMARK OFFICE
CERTIFICATE OF CORRECTION

PATENT NO : 5,928,304
DATED : July 27, 1999
INVENTOR(S) : Todd W. Priess

It is certified that error appears in the above-identified patent and that said Letters Patent are hereby corrected as shown below:

Col. 18, line 2, delete "inlcudes the stps" and replace with --includes the steps--.

Col. 18, line 21, delete "theinset" and replace with --the inset--.

Col. 19, line 26, delete "leats" and replace with --least--.

Col. 20, line 6, delete "porvide" and replace with --provide--.

Signed and Sealed this

Eighth Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 5,928,304
DATED : July 27, 1999
INVENTOR(S) : Todd W. Priess

It is certified that error appears in the above-identified patent and that said Letters Patent is hereby corrected as shown below:

Columns 5-6,
Line 7, delete "ATFL!" and replace with -- ATTL! --.
Line 15, delete "EUD" and replace with -- EL2D --.
Line 36, delete "SORDATA19" and replace with -- SORDAT19 --.
Line 49, delete "ATIF" and replace with -- ATTF --.
Line 76, delete "LSRML" and replace with -- LSRAIL --.
Line 85, delete "SORDATA19" and replace with -- SORDAT19 --.

Column 7,
Line 5, before "called" insert -- so --.
Line 13, delete "OOOSFE" and replace with -- OOO5SE --.
Line 16, delete "OBFT" and replace with -- OBPT --.
Lines 16, 26 and 30, delete "125E" and replace with -- 12SE --.
Line 29, delete "graph, SRECD" and replace with -- graph, 5RECD --.
Last line of the second data file, delete "S26D" and replace with -- SEGT --.

Column 8,
Line 14, delete "data" and replace with -- data. --.

Column 10,
Line 45, delete "region region" and replace with -- region --.
Line 47, delete "CDROM." and replace with -- CDROM, --.

Column 11,
Line 14, delete "modiifed" and replace with -- modified --.
Line 40, delete "diemnisonal" and replace with -- dimensional --.
Line 41, delete "segemnt" and replace with -- segment --.
Line 43, delete "identifer" and replace with -- identifier --.

Column 12,
Lines 5 and 7, delete "surrounds the the inset" and replace with -- surrounds the inset --.
Line 47, delete "identifer" and replace with -- identifier --.
Line 58, delete "inside the the inset" and replace with -- inside the inset --.

Column 13,
Line 5, delete "identiifer" and replace with -- identifier --.
Line 25, delete "it" and replace with -- It --.
Line 43, delete "segment goes enters" and replace with -- segment enters --.

UNITED STATES PATENT AND TRADEMARK OFFICE
CERTIFICATE OF CORRECTION

PATENT NO. : 5,928,304
DATED : July 27, 1999
INVENTOR(S) : Todd W. Priess

It is certified that error appears in the above-identified patent and that said Letters Patent is hereby corrected as shown below:

Column 14,
Line 14, delete "spatila" and replace with -- spatial --.
Line 20, delete "bounday" and replace with -- boundary --.
Line 49, delete "defines the a boundary" and replace with -- defines the boundary --.
Line 56, delete "data vales" and replace with -- data values --.

Column 17,
Line 7, delete "performming" and replace with -- performing --.

Column 18,
Line 2, delete "includes the stps" and replace with -- includes the steps --.
Line 21, delete "theinset" and replace with -- the inset --.

Column 19,
Line 26, delete "leats" and replace with -- least --.

Column 20,
Line 6, delete "porvide" and replace with -- provide --

This certificate supersedes Certificate of Correction issued May 8, 2001.

Signed and Sealed this

Twenty-fourth Day of August, 2004

JON W. DUDAS
*Director of the United States Patent and Trademark Office*